May 20, 1952 J. J. HARDY 2,597,792
FISH LURE
Filed May 5, 1947
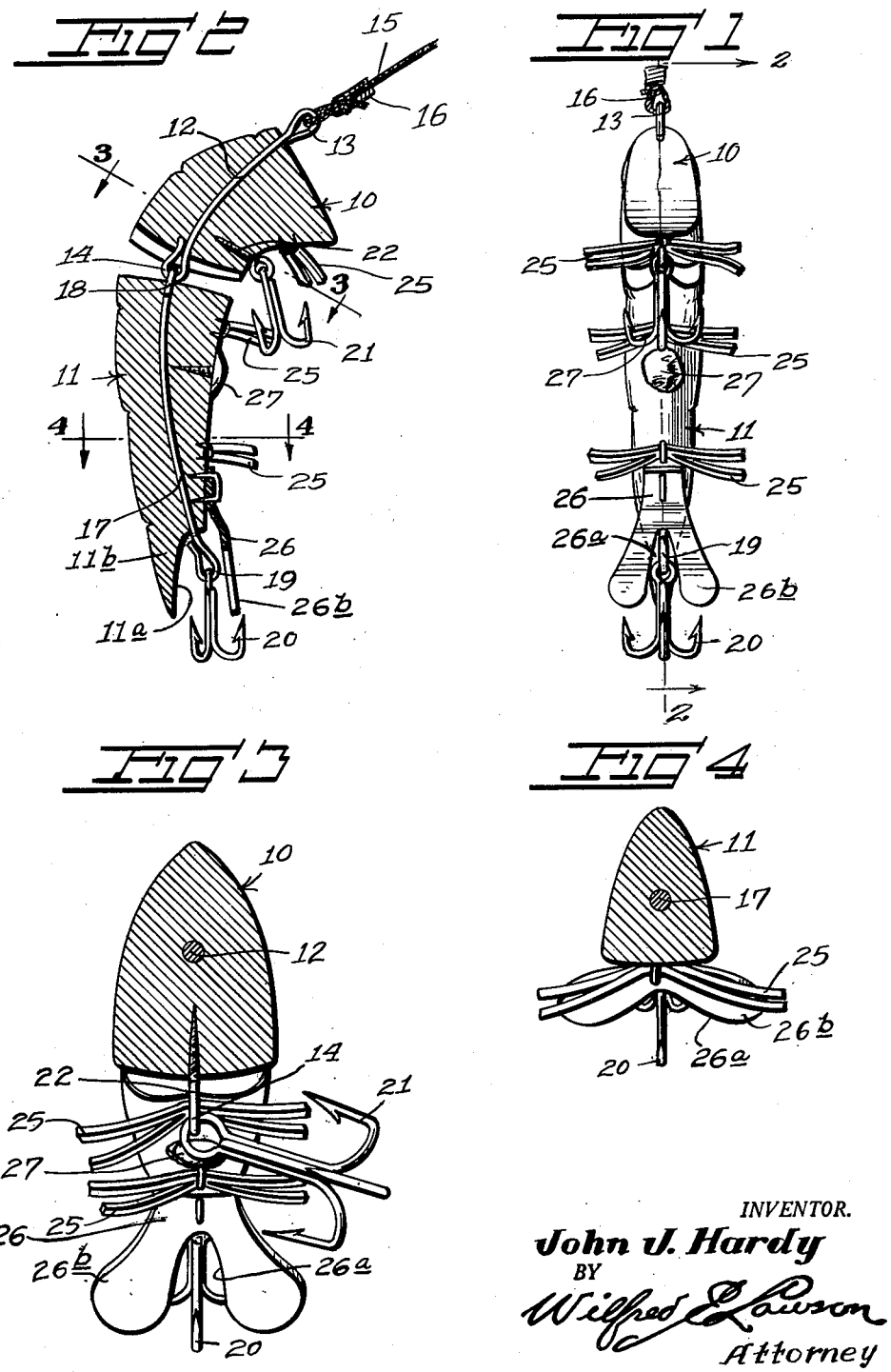
INVENTOR.
John J. Hardy
BY
Wilfred Lawson
Attorney Patented May 20, 1952

2,597,792

UNITED STATES PATENT OFFICE 2,597,792

FISH LURE

John James Hardy, Vernon, Fla.

Application May 5, 1947, Serial No. 745,899

1 Claim. (Cl. 43—42.15)

My invention relates to a fish lure simulating a headless shrimp which is made in two parts hinged together and so constructed and attached to the end of a fish line, that it will pass thru the water end ways in an upright position in imitation of a real shrimp instead of side ways but like a shrimp fleeing from his enemies. This invention forms an improvement in my issued Patent No. 2,089,605 of August 10, 1937.

One embodiment of the invention is illustrated in the attached drawing wherein like numerals denote the same details in the different views:

Figure 1 is an elevation seen from the underside of the shrimp lure;

Figure 2 is a vertical section taken on a plane along line 2—2 of Figure 1; and

Figures 3 and 4 are respectively transverse sections on planes along lines 3—3 and 4—4 of Figure 2.

Further objects and functions of this lure will be evident from the subjoined description with the aid of the attached drawing.

This fish lure, which is made from some fairly hard substances, represents the tail end of a large shrimp with the head cut off. It consists of a fore part 10 and a hind part 11 of which the fore part 10 is about half as long as the hind part 11, or in other words, the fore part is about one third of the total length of the tail.

Thru the fore part 10 a wire 12 extends, looped at both ends as at 13 and end 14, of which loop 13 protrudes thru the forward end of the fore part 10, where is is attached directly to a fish line 15 or by means of a swivel 16.

Similarly a second wire 17, looped at each exposed end as at 18, and 19, is embedded in the hind part 11 and having its loop 18 attached to loop 14 of the fore part 10 and its loop 19 providing an eye at the end of the hind part for the attachment of a fish hook 20 which swings freely thereon.

The rear, free end of the part 11 is undercut as indicated at 11a, providing a tail portion 11b which overlies the eye 19 to which the hook 20 is attached.

It will be evident that a pull on the hook, as from the bite of a fish, will be transferred directly to the fish line 15, thus taking the strain of the fish off the body of the lure. Another bite hook 21 is freely suspended from a screw eye 22 threaded in the fore part 10.

The front and hind parts 10, 11 of the body are preferably painted white with a phosphorescent admixture to provide a luminous effect at night.

At 25, are shown a plurality of limp fingers of flexible material on the fore part 10 and the rear part 11 and close to the rear end of the hind part 11 is secured a substantially flat tail piece 26 having a V-shaped slot 26a opening through the center of its rear edge to provide a pair of divergent flappers or fins 26b, extending below and at opposite sides of the eye 19 and the shank of the hook 20, which may be brightly colored as well as the fingers 25.

The tail piece 26 extends across and is spaced from the undercut portion 11a of the tail portion 11b to overlie the eye 19 and the slot 26a is in line with the shank of the hook 20 whereby the hook may swing freely away from the tail portion 11b as is clearly shown in Figure 1.

At 27 is shown a pellet of lead, on the underside of the hind part 11, a short way down from the top thereof, which pellet is intended to weight the lure to keep it upright instead of lying sideways, in order to imitate the manner in which a live shrimp travels thru the water.

The fish lure, being a simulation of the tail portion of a shrimp, is simple in construction, consisting of a few parts. Its body can be built from any suitable material, but preferably solid and firm, that can be painted or dyed red; the fins and fingers however, must be flexible.

By the hinging together of the two body portions 10 and 11 the lure has a natural and lifelike movement in the water, the lead pellet 27 causing the hind portion 11 to fold up at every stoppage and then suddenly to return to straightened out position. Thus the lure travels with a jumpy, wiggling motion, just like a live shrimp in the water.

I claim:

In a fish lure simulating a headless shrimp, an elongated forward arcuate body, a somewhat longer rear arcuate body, said bodies tapering in a rearward direction with the adjacent ends of the same of substantially equal area, a wire passing through each of said bodies lengthwise thereof, the leading end of the wire in said forward body terminating in a line attaching end and its trailing end in a loop, the forward end of the wire in said rear body terminating in a loop in engagement with the first loop and its trailing end in a hook attaching eye, the rear end of said rear body being undercut to provide a tail portion overlying the said hook attaching eye, a screw eye secured in the lower side of said forward body for the attachment of a hook thereto, a plurality of limp members secured on the lower side of each of said bodies, a flat flared tail piece secured to the lower side of the rear end portion of said rear body forwardly of the said undercut and projecting rearwardly in underlying relation with respect to the hook carried at the rear end of the wire in said rear body, the flared portion of said tail piece having a V-shaped slot opening through its rear edge to provide a pair of divergent fin-like portions extending below and at opposite sides of the last named hook attaching eye and the shank of the hook carried thereby, and a weight secured on the under side of said tail portion to keep the lure in a life-like position as it is being trolled.

JOHN JAMES HARDY.

REFERENCES CITED

The following references are of record in the file of this patent:

UNITED STATES PATENTS

| Number | Name | Date |
| --- | --- | --- |
| 1,791,316 | Jordan | Feb. 3, 1931 |
| 2,089,605 | Hardy | Aug. 10, 1937 |
| 2,091,457 | Sauer | Aug. 31, 1937 |
| 2,110,382 | Martin | Mar. 8, 1938 |
| 2,168,894 | Arbogast | Aug. 8, 1939 |
| 2,334,792 | Royston | Nov. 23, 1943 |
| 2,473,142 | Gilmore | June 14, 1949 |